(12) United States Patent
Ring et al.

(10) Patent No.: US 8,028,976 B2
(45) Date of Patent: Oct. 4, 2011

(54) MACHINING FIXTURE WITH SELF-CONTAINED HYDRAULICS

(75) Inventors: Jerry R. Ring, Trevor, WI (US); John R. Liegakos, Kenosha, WI (US); Robert R. Kirykowicz, Chicago, IL (US); John S. Grzyb, Trevor, WI (US)

(73) Assignee: Ocenco, Inc., Pleasant Prairie, WI (US)

( * ) Notice: Subject to any disclaimer, the term of this patent is extended or adjusted under 35 U.S.C. 154(b) by 993 days.

(21) Appl. No.: 11/872,423

(22) Filed: Oct. 15, 2007

(65) Prior Publication Data

US 2009/0096145 A1    Apr. 16, 2009

(51) Int. Cl.
*B23Q 3/00* (2006.01)

(52) U.S. Cl. .................. 269/20; 269/32; 269/24; 269/27

(58) Field of Classification Search .............. 269/20, 269/32, 24, 27; 29/559, 281.1, 38 R, 38 A–38 C; 409/219, 221, 225
See application file for complete search history.

(56) References Cited

U.S. PATENT DOCUMENTS

| | | | | |
|---|---|---|---|---|
| 2,131,347 A | * | 9/1938 | Fenton | 24/681 |
| 3,736,840 A | * | 6/1973 | Durand | 409/167 |
| 4,413,937 A | * | 11/1983 | Gutsche | 408/239 A |
| 4,678,077 A | * | 7/1987 | Bertorello | 198/867.02 |
| 4,722,263 A | * | 2/1988 | Valentin | 92/13.7 |
| 4,772,201 A | * | 9/1988 | Johnsen et al. | 433/134 |
| 4,799,657 A | * | 1/1989 | Miller | 269/24 |
| 4,805,281 A | * | 2/1989 | Stark et al. | 29/252 |
| 4,828,240 A | * | 5/1989 | Longenecker et al. | 269/47 |
| 4,850,099 A | * | 7/1989 | Scollard | 29/563 |
| 5,243,745 A | * | 9/1993 | Varnau | 29/33 P |
| 5,261,147 A | * | 11/1993 | Wood, III | 29/33 P |
| 5,261,148 A | * | 11/1993 | Ettori | 29/38 B |
| 5,265,497 A | * | 11/1993 | Curless | 74/608 |
| 5,341,599 A | * | 8/1994 | Cox | 49/375 |
| 5,454,148 A | * | 10/1995 | Ewer et al. | 29/33 J |

(Continued)

OTHER PUBLICATIONS

ENERPAC, "Workholding Catalog, A Global Resource of Workholding Solutions," pp. 1-180 (2004).

*Primary Examiner* — George Nguyen
(74) *Attorney, Agent, or Firm* — Marshall, Gerstein & Borun LLP

(57) ABSTRACT

A new arrangement for machining parts is disclosed. The parts to be machined are mounted on fixture plates on a fixture. Using a stationary hydraulic line, hydraulic equipment is then pressurized by a pump within the fixture. The pump is mechanically powered by a separate (and disconnectable) power source. A rotatable coupling is attached to the pump. It receives a spindle from a CNC machine, enabling the machine to activate the pump by rotating the spindle while the spindle is received in the coupling. The coupling has axially extending prongs that form slots that accommodates the spindle. The prongs have ends that taper inwardly toward the slots. The spindle is also used to actuate a pressure release valve. The fixture also has at least four angled work faces and an access face that separates two of those faces. In operation, parts are first mounted on the fixture plates. The fixture is then moved to a work area, where the spindle actuates the pump, pressuring clamps that lock the parts in position. The parts are then machined, and the spindle then actuates the pressure release valve to release the pressure in the clamps. The fixture is then moved out of the work area, and the parts are removed. The process is then repeated for the next batch of parts.

18 Claims, 8 Drawing Sheets

U.S. PATENT DOCUMENTS

| | | | |
|---|---|---|---|
| 5,582,396 A * | 12/1996 | Brasca et al. | 269/20 |
| 5,582,397 A * | 12/1996 | Lanvin | 269/25 |
| 5,695,177 A * | 12/1997 | Mascola | 269/24 |
| 5,788,225 A * | 8/1998 | Iwata et al. | 269/309 |
| 5,927,463 A * | 7/1999 | Lee | 198/346.1 |
| 6,000,687 A * | 12/1999 | Andre | 269/22 |
| 6,094,793 A * | 8/2000 | Szuba | 29/33 P |
| 6,183,188 B1 * | 2/2001 | Randazzo et al. | 414/744.5 |
| 6,470,547 B2 * | 10/2002 | Burge et al. | 29/33 P |
| 6,502,835 B1 * | 1/2003 | Tiede | 279/5 |
| 6,581,921 B2 * | 6/2003 | Griggs | 269/37 |
| 6,629,355 B2 * | 10/2003 | Murata et al. | 29/563 |
| 6,938,312 B2 * | 9/2005 | Kitaura | 29/33 P |
| 7,032,897 B2 * | 4/2006 | Hausler, III | 269/32 |
| 7,083,166 B1 * | 8/2006 | Durfee | 269/32 |

* cited by examiner

MACHINING FIXTURE WITH SELF-CONTAINED HYDRAULICS

CROSS-REFERENCE TO RELATED APPLICATIONS

Not applicable.

BACKGROUND OF THE INVENTION

This invention relates generally to manufacturing, and particularly to the fixtures that are used to hold parts while they are machined by equipment such as CNC ("computer numerical control") equipment in a machining center.

One conventional fixture that is commonly used to hold small metal parts during machining has hydraulic clamp arms that hold a number of parts to a fixture. After the parts to be machined are loaded onto the fixture, an operator connects a hydraulic line to a fitting on the fixture and opens a hydraulic source, energizing the clamp arms so that they hold the parts in place. The hydraulic line is then removed, and the fixture enters a work area where the parts are machined by the CNC equipment. After the machining is completed, the fixture is pulled from the work area, the hydraulic line is reconnected, the hydraulic pressure is released through the line, and the parts are removed from the fixture. The process is then repeated for the next batch of parts.

There are several potential problems with this kind of system. First, connecting, disconnecting, and reconnecting the hydraulic line leads to wear of the fitting. In addition to wear, the fitting can become damaged by exposure to coolant or machining chips, or by operator mishandling. Second, operators may forget or fail to connect or energize the hydraulic line, or forget or fail to remove the hydraulic line before the fixture enters the work area. These mistakes can lead to costly machine damage or a system crash.

BRIEF SUMMARY

The applicants have developed a new machining arrangement that can reduce these problems, providing safety and labor benefits. There are several different aspects of the new arrangement that can provide advantages.

One distinct aspect of the new arrangement is a new machining method. As in prior arrangements, in this method the parts to be machined are mounted on a fixture. Unlike in previous methods, however, in this method the hydraulic equipment is pressurized by a pump within the fixture, rather than by an external hydraulic source. Using a pump within the fixture can eliminate the need for repeatedly connecting and disconnecting a hydraulic line.

Another aspect of the new arrangement is a new kind of machining center. As in prior arrangements, the disclosed machining center has a hydraulic line that connects a pump to hydraulic equipment. The new machining center is different in two ways, however. First, the pump is different. Instead of being powered (for example) by an integral motor, it is powered by a separate (and disconnectable) mechanical power source. Second, the hydraulic line is stationary, extending between two fixture components (the pump and the hydraulic equipment) that are both fixed parts of the fixture.

The fixture that is used in the machining center is a third new aspect of the arrangement. The fixture differs from previously known fixtures in two ways. First, the fixture has at least four angled work faces and an access face that separates two of those faces. This arrangement makes it easier to load the fixture without indexing the pallet on which the fixture is mounted. Second, the fixture has a rotatable coupling that receives a spindle from a CNC machine, enabling the machine to activate the pump by rotating the spindle while the spindle is received in the coupling.

The illustrated coupling has two axially extending prongs that form slots that accommodate the spindle. The prongs have ends that taper inwardly toward the slots.

The disclosed arrangement also has a pressure release valve that is positioned where it can be actuated by the spindle.

BRIEF DESCRIPTION OF THE DRAWINGS

The arrangement can be better understood by referring to the accompanying drawings, in which.

DETAILED DESCRIPTION

Figure 1:
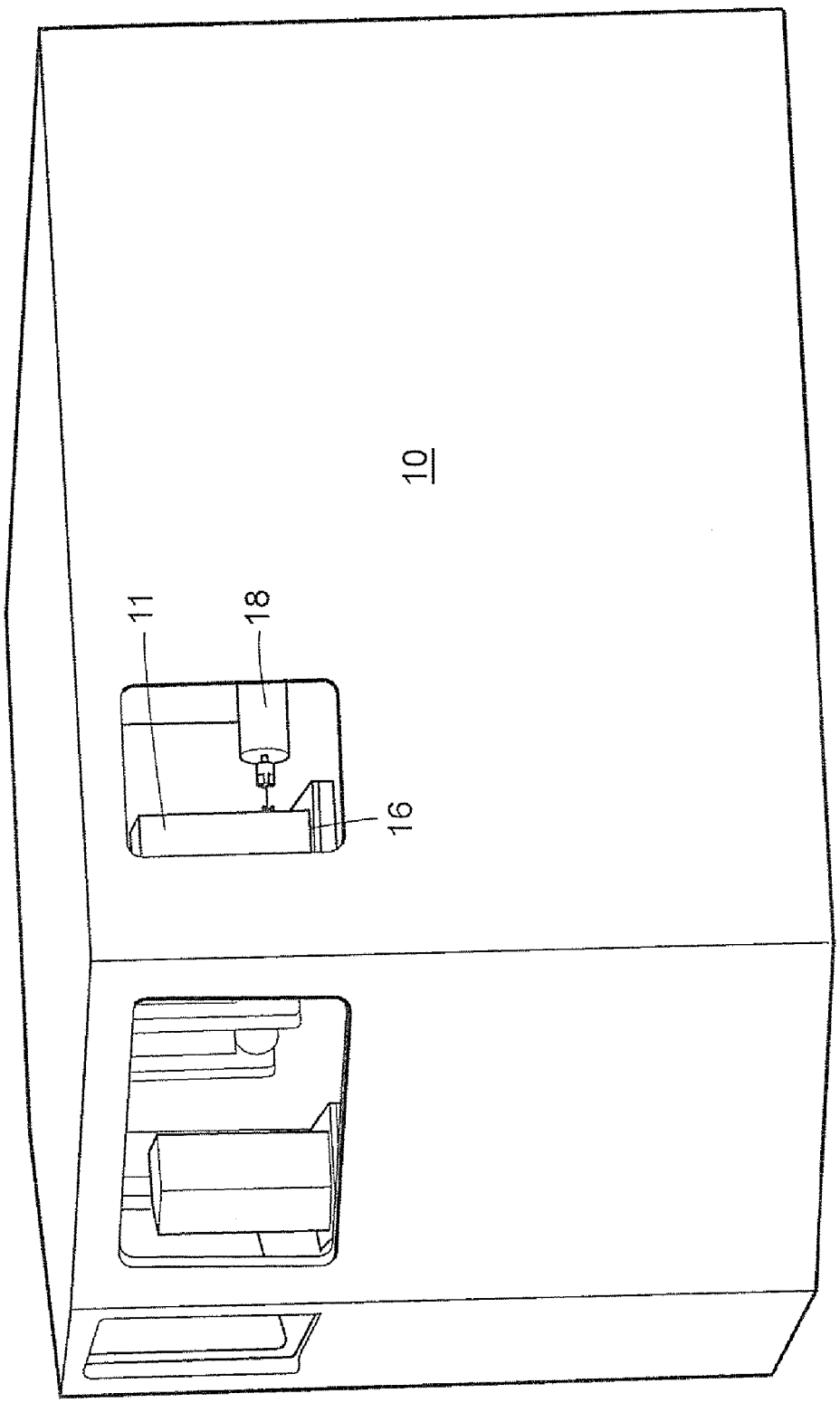
FIG. 1 is a perspective view of a machining center in which the new arrangement is used.
Figure 2:
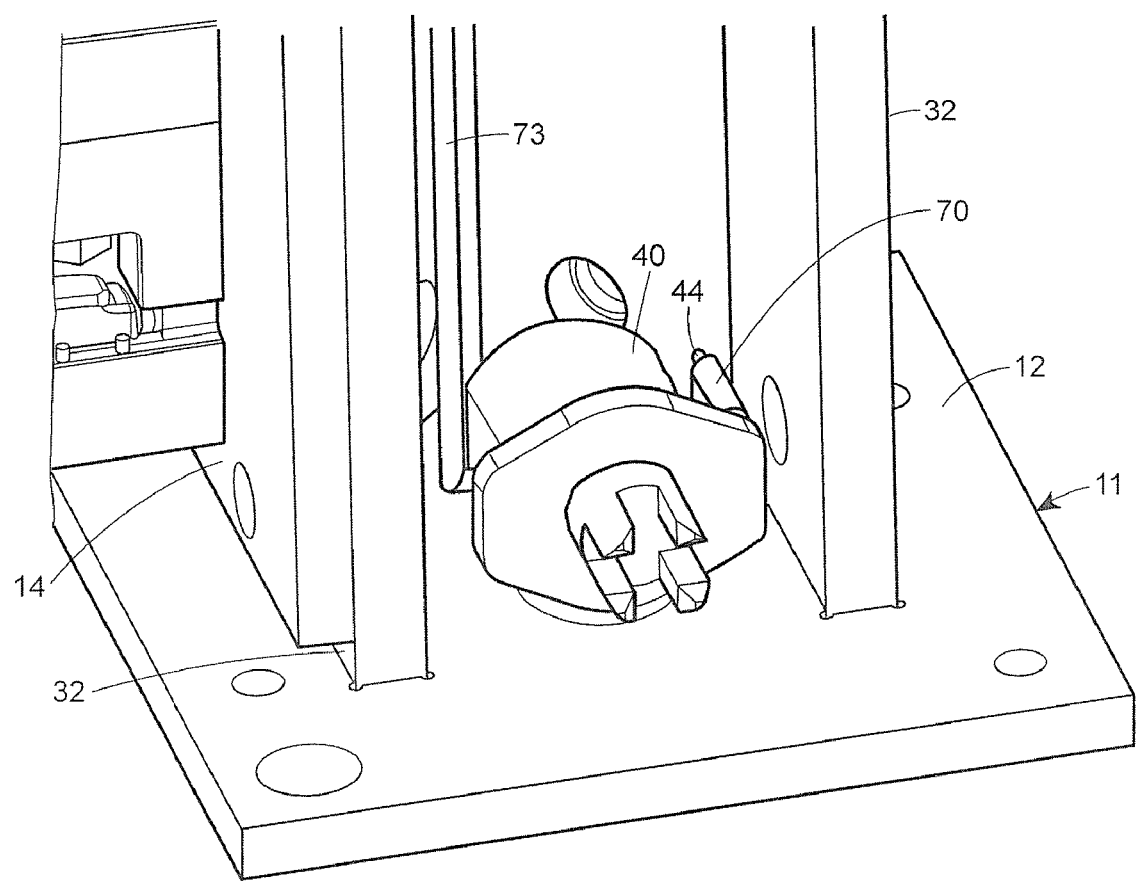
FIG. 2 is an enlarged, fragmentary back view of a horizontal fixture that can be used in the machining center of FIG. 1. The access face of the fixture has been removed so some of the internal components are exposed.

In broad terms, the illustrated machining center 10 seen in FIG. 1 has three primary components: a structure 11 that holds parts that are to be machined (the structure will typically be a fixture with attached fixture plates), a pallet 16 that is used to move the structure within the machining center, and a machine 18 that machines the parts that are held on the structure. Each of these components will be discussed in turn.

The Fixture Plates

The fixture plates carry the structure that holds the parts that are to be machined. The shape and arrangement of the fixture plates can vary from job to job. Often, the fixture plates will be designed and arranged specifically for a particular job. The fixture plate 14 that is illustrated in FIGS. 2-7 is designed for holding a specific type of part to be machined, and has hydraulic swing cylinders 22 (see FIG. 5) that hold multiple parts 24. Depending upon the circumstances, many different types of clamps or swing cylinders can be used, including upper flange swing cylinders, lower flange swing cylinders, threaded body swing cylinders, cartridge model swing cylinders, positive locking swing cylinders, pivoting t-arms, and other special swing cylinders. While swing cylinders or clamps are commonly used for holding parts in place, other types of hydraulic equipment can be used (instead of or in addition to clamps or swing cylinders) where there are other needs.

The illustrated swing cylinders 22 hold the parts 24 in position for one (op. 10) machining operation. The illustrated fixture plate 14 could have a second column of swing cylinders that could be used to hold another set of parts in a rotated position for a second (op. 20) machining operation. Other fixture plate arrangements can also be used, and known work supports can also be provided where needed.

As is common in the industry, the illustrated fixture plates 14 have conventional quick change fittings that cooperate with mating fittings 26 on the fixture 12. These fittings enable the fixture plates to be quick-release mounted to the fixture. Easy mounting provides flexibility to the machine shop: rather than create an entirely new fixture for each different job, the same fixture can be used for multiple jobs by replacing the fixture plates with different plates that are tailored for that particular job.

The Fixture

The fixture can take two general forms, one for vertical machining and the other for horizontal machining.

The fixture 12 that is illustrated in FIGS. 2-7 is used for horizontal machining. Although variations are possible, it has a vertical access face 30 and four vertical work faces 32 that are all mounted to a base plate 34. The illustrated faces are made of 1" thick steel, and are approximately 22" tall and 8" wide. Each of the four work faces has mating fittings 26 that cooperate with quick-change fittings on the fixture plates 14. Other sizes and arrangements could be used for different sized tables/pallets or if the fixture has a different number or configuration of work faces.

Figure 4:
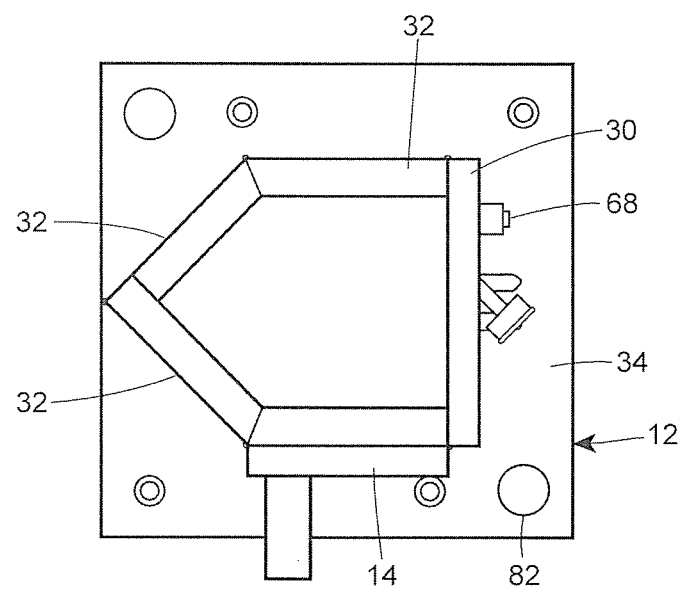
Figure 5:
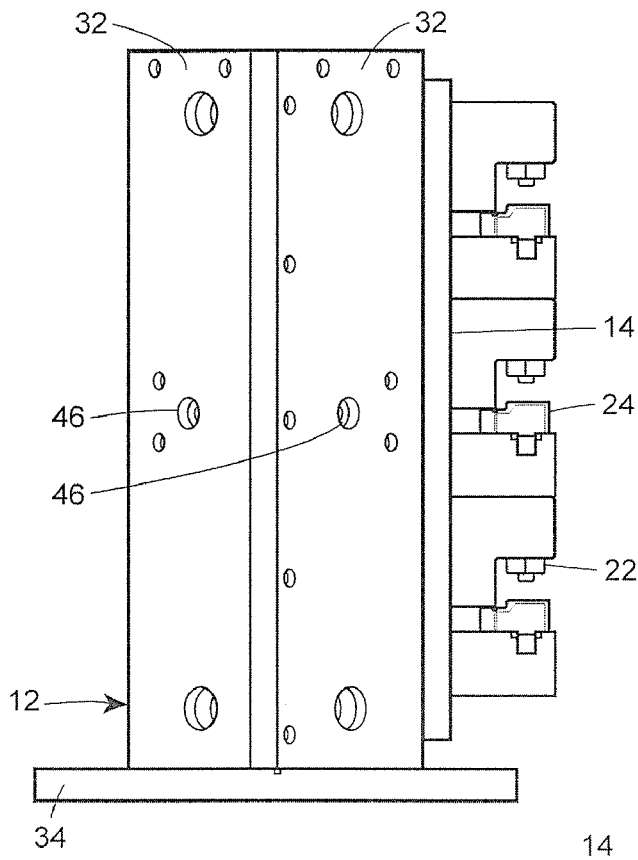

Although only one fixture plate 12 is shown here, a separate fixture plate would commonly be attached to each of the four work faces 32. Through attached fixture plates 14, the work faces 32 hold the parts 24 that are to be machined. The illustrated work faces are each angled with respect to each other, and, as seen in FIG. 4, the sum of the interior angles between consecutive work faces is, in this case, 360°. Specifically, the illustrated arrangement has two outside work faces angled 90° back from the front of the fixture, and two other equally-sized central work faces angled 45° back from the front. The interior angle between the central work faces is 90°, and the angle between each of the two central faces and its adjoining outside face is 135°, making the sum of the three angles: 135°+90°+135°=360°. In this arrangement, an operator positioned in front of the fixture 12 (that is, facing the front corner as seen in FIG. 5) can access all four work faces (and thus, all four fixture plates) without having to rotate the fixture. The ability to load the fixture plates without having to move the fixture facilitates loading and unloading of the fixture. While the specific arrangement that is illustrated may be preferred in some situations, some advantages of the new arrangement can be derived even if the sum of the interior angles between the work faces is as little as 300°.

While it is generally preferred that the work faces have parallel axes (in this case, they all have parallel vertical axes), that may not always be required. The work faces may, for example, be canted with respect to each other or from the vertical when so desired.

The fixture 12' illustrated in FIGS. 8-11 is used for vertical machining. Although variations are possible, it has an extended horizontal work face 32' on which fixture plates 14 can be mounted in a side-by-side arrangement. In this example, the fixture plates are aligned in a single, parallel row (the swing cylinders, etc, have been omitted here), but other arrangements, including a grid of multiple rows or even non-linear patterns (such as circular patterns) might also be used in appropriate circumstances. The fixture seen here has a raised, horizontal access face 30', but other arrangements are also possible.

In both the vertical arrangement and the horizontal arrangement, the fixture 12 also has a hydraulic pump 40 (FIG. 2) that is mechanically-activated and powered by a remote source. Although many different types of pumps might be used in different situations, the illustrated pump is a hydraulic motor. Normally, hydraulic motors are powered by pressurized hydraulic fluid and transfer rotational kinetic energy to mechanical devices. However, a hydraulic motor can also act as a hydraulic pump when powered by a mechanical source and operated in a reverse direction.

In addition to many different types of pumps (including, for example, screw pumps intended for manual operation), many different types of hydraulic motors are available and might be used in the new system. In the illustrated example, the hydraulic motor is an internal gear motor, in which pressurized fluid is normally used to turn internal gears, producing output torque. Operated in reverse, input torque is converted to hydraulic pressure. Other possible hydraulic motor options that might be used as a pump in the new arrangement include hydraulically-powered axial piston motors, hydraulically-powered radial piston motors, hydraulically-powered external gear motors, and hydraulically-powered vane motors.

The pump 40 is a fixed part of the fixture 12. In the horizontal arrangement, the pump is mounted in a chamber behind the access face 30 and between the work faces 32 of the fixture. In the vertical arrangement, it is mounted in a chamber beneath the raised access face 30'.

Figure 3:
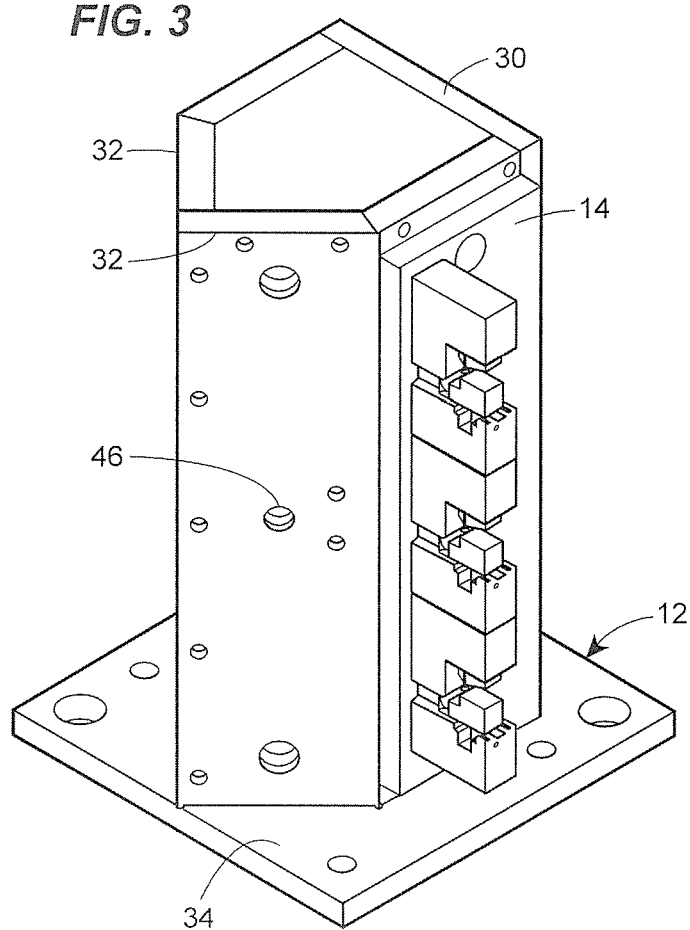
FIGS. 3-7 are perspective, top, front, back, and side views of the horizontal fixture of FIG. 2.
Figure 7:
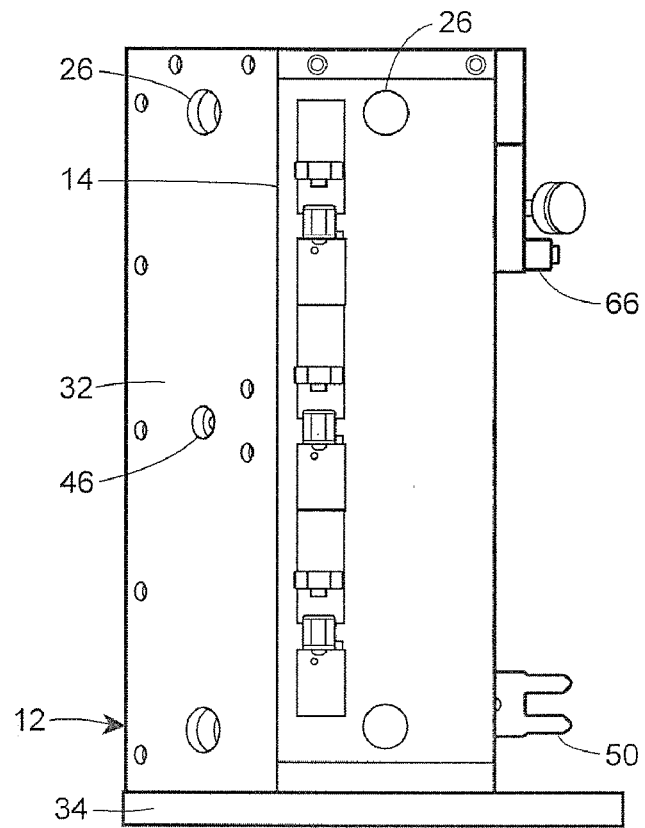
Figure 8:
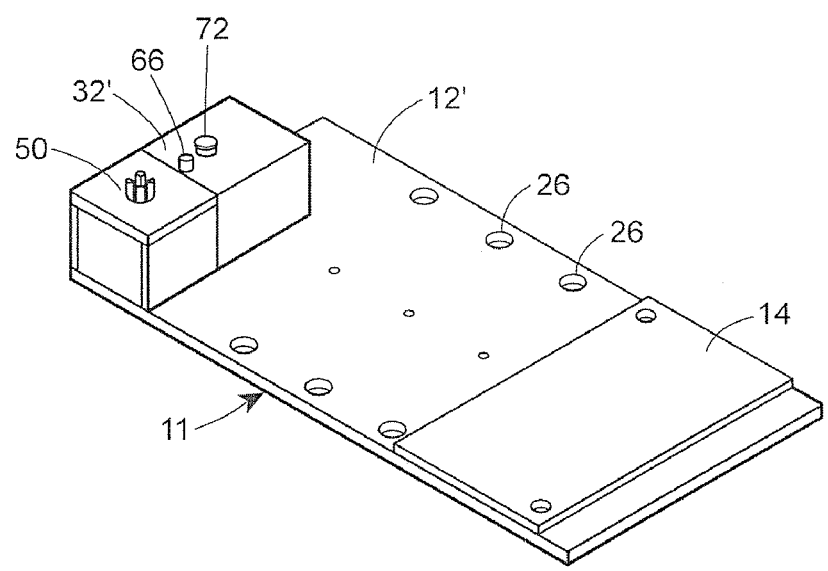
FIGS. 8-11 are perspective, end, side, and top views of a vertical fixture that can be used.
Figure 9:
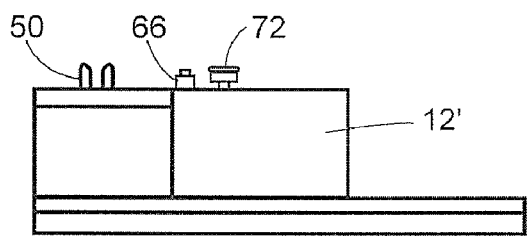
Figure 10:
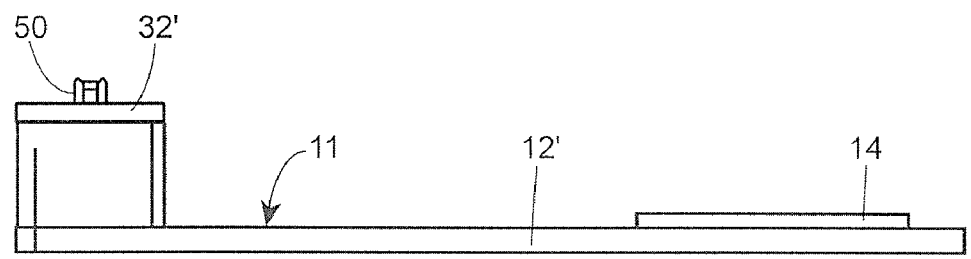
Figure 11:
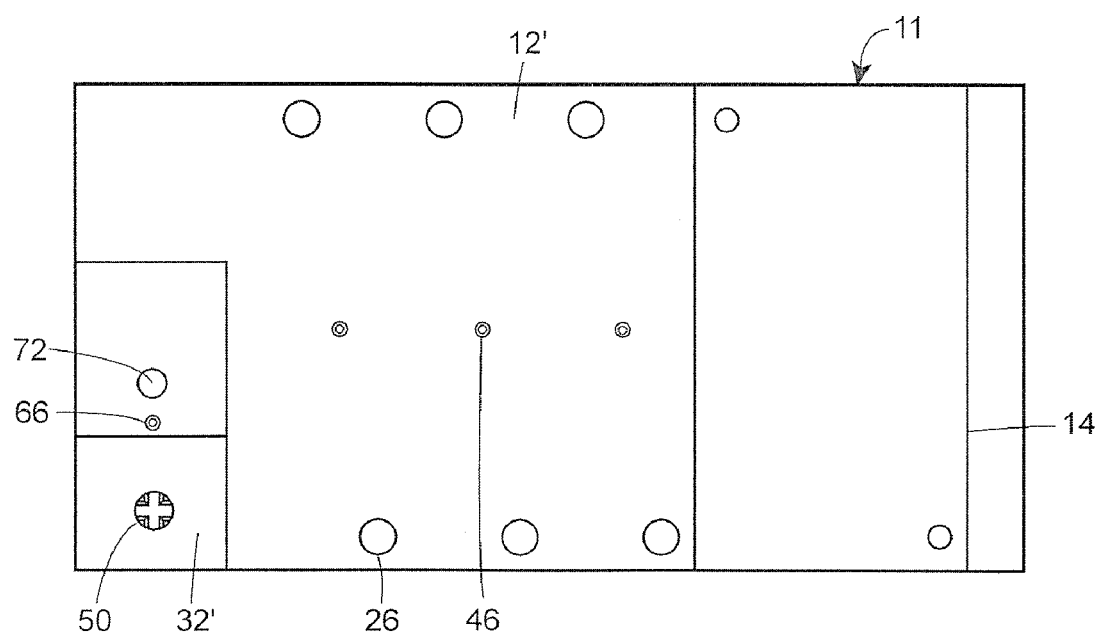
Figure 12:
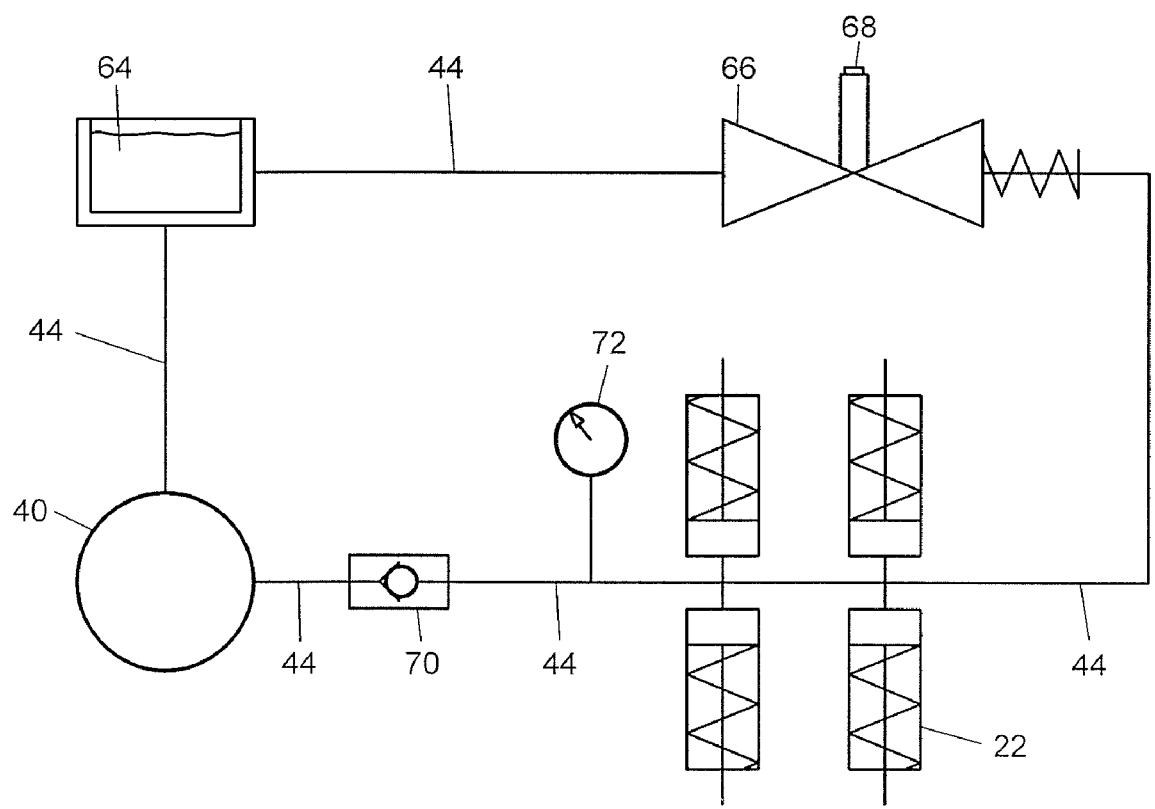
FIG. 12 is a schematic view of a hydraulic system that can be used in the arrangement.

As indicated schematically in FIG. 12, a hydraulic line 44 extends from the pump 40 and supplies the swing cylinders 22 on the structure 11. (In arrangements where other hydraulic equipment is used on the structure, the hydraulic line could also be connected to that equipment.) In the illustrated example, the hydraulic line leads through the fixture 12 to supply hydraulic couplers 46 on each of the work faces 32 (FIGS. 3, 5, and 7). As is common in the industry, these hydraulic couplers are connected to mating couplers on the fixture plates 14, which in turn lead to the swing cylinders on the fixture plates. Connecting the pump and hydraulic line in this way enables the pump to be used to energize the swing cylinders, preventing the need for the structure to be repeatedly connected and disconnected to a separate pump source.

The hydraulic line 44 can include both conventional tube sections and drilled openings (such as gun-drilled openings) through the work faces 32 and/or the fixture plates 14.

To eliminate the need for a separate power source within the structure 11, the illustrated arrangement includes a robotically-operable, rotatable coupling 50 that enables the pump 40 to be mechanically powered from an outside source. The illustrated coupling is mechanically connected to the pump and, as suggested in FIG. 13, receives a spindle 54 from the machine 18, enabling the machine to activate the pump by rotating the spindle while the spindle is received in the coupling. Although other arrangements are possible, the illustrated coupling is on the access face 30 to minimize possible interference from the parts 24 that are being held on the structure.

Figure 13:
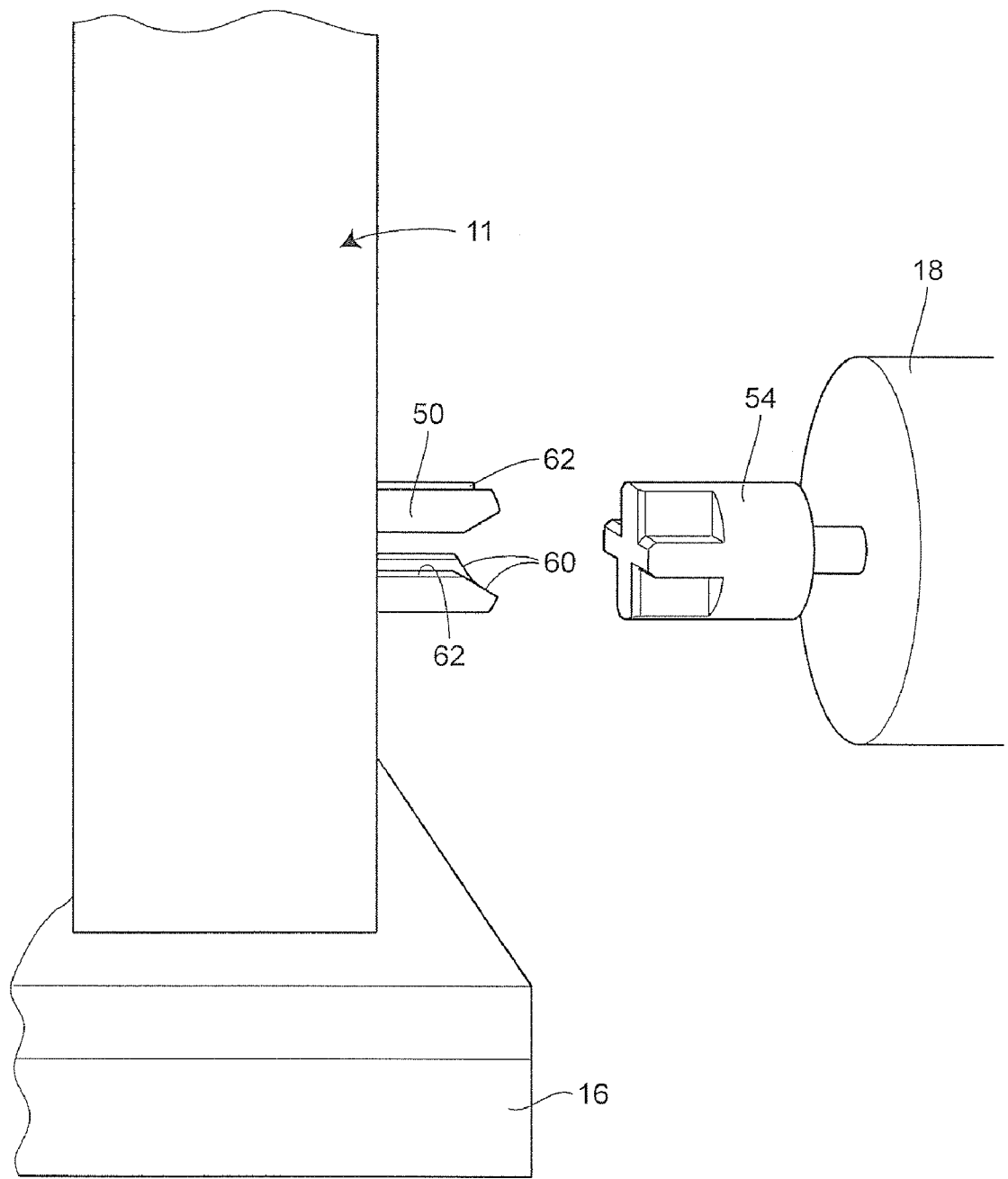
FIG. 13 is a close-up perspective view of a spindle approaching a coupling in the new arrangement.

As best seen in FIG. 13, the illustrated coupling 50 has four axially extending prongs 60 that separate two transverse slots 62. Although the exact size will depend upon the intended use, the illustrated coupling is approximately 6" long and has a diameter of approximately 3". The slots are approximately 0.5" wide. This width is designed to closely match the thickness of the vanes on the spindle 54 on the illustrated machine 18, allowing the slots to accommodate the spindle. The approximately 2" long prongs are made of aluminum (or a similar material that is softer than the steel of the spindle) so that any damage or wear will be suffered primarily by the relatively inexpensive coupling, rather than by the spindle. The illustrated prongs have ends that taper inwardly toward the slots. The taper helps to guide the spindle into proper orientation in the slots. In this example, the angle of taper is approximately 45° back from a radial plane of the coupling.

Figure 6:
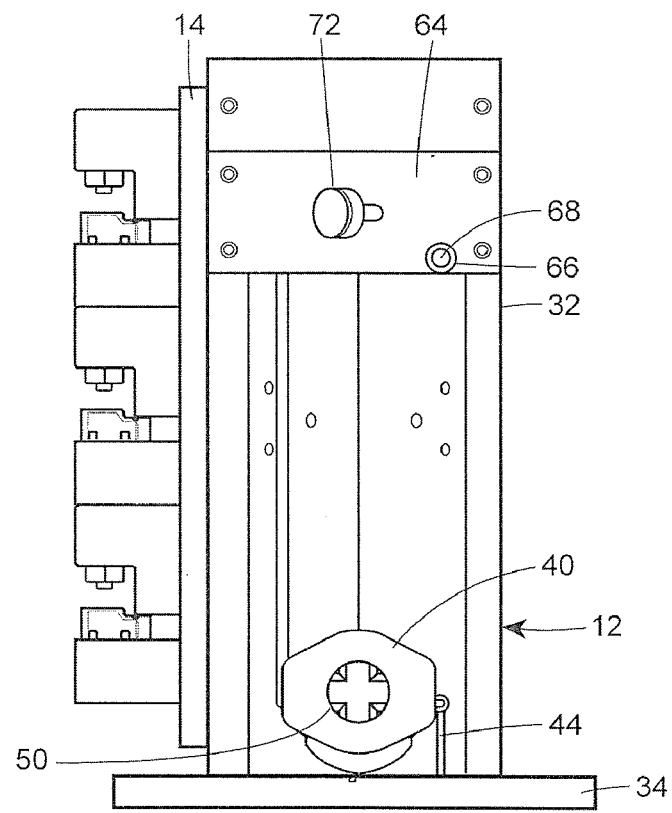

The illustrated fixture 12 also has an integrated hydraulic reservoir 64 on the hydraulic line 44, as seen in FIGS. 6 and 12. Because the reservoir is a fixed part of the fixture, there is no need for the fixture to be repeatedly connected and disconnected to an outside hydraulic reservoir. In addition, the hydraulic line is shorter than it would need to be if connected to an outside reservoir, reducing the amount of hydraulic fluid required in the system. In the illustrated system, the reservoir has a capacity of approximately 32 oz.

As seen in FIGS. 6, 7, and 12, the illustrated hydraulic system also has a pressure-release valve 66 on the hydraulic line 44. In this example, the hydraulic line forms a circuit that includes (a) a pressurized section that runs from an outlet side of the pump 40 to a check valve 70 (FIG. 2), to a pressure gauge 72 (FIG. 6), to the swing cylinders 22 (FIG. 5), and to the pressure-release valve, and (b) a release section that runs from the pressure-release valve to the reservoir 64, and back through a feed line 73 (FIG. 2) to an inlet side of the pump. When actuated, the pressure release valve opens the pressurized section of the hydraulic line, enabling the fluid to flow back to the reservoir and thereby releasing the pressure in the system.

The illustrated pressure-release valve 66 is an auto-closing valve that is released by pressing a button 68 that is positioned on the access face 30. In this location, the valve can be actuated by the spindle 54 after the machining operations are completed, with minimal interference from the parts 24 that are being held on the structure 11.

The pressure gauge 72 allows an operator to check the pressure in the pressurized section of the hydraulic line 44.

In the illustrated location, the check valve 70 prevents hydraulic fluid from returning to the pump 40, assuring that pressure in the pressurized section of the hydraulic line 44 is maintained—even after the pump is no longer running—until the pressure-release valve 66 is actuated.

As apparent from FIG. 12, the illustrated hydraulic line 44 is arranged in a one-stage system. When the pump 40 pressurizes the line, the pressure activates the swing cylinders 22, causing the swing cylinders to clamp down on the parts 24 being held on the structure 11. When the pressure in the hydraulic line is released by activating the pressure-release valve 66, springs in the swing cylinders cause them to release. A two-stage system, in which active hydraulic pressure is used to release the swing arms and reset the pressure-release valve, is also possible.

The Pallet

Conventionally, fixtures are loaded and then moved before the machining operations begin, and then, after the machining operations are completed, are moved again before the parts are unloaded. Attaching the fixture 12 to a pallet 16 facilitates these movements. The base plate 34 of the illustrated horizontal fixture 12 measures 400 mm by 400 mm, and has conventional quick-change fittings 82 (FIG. 4) that enable the fixture to be quickly secured to a standard 400 mm pallet. Other sizes of pallets, such as 500 mm pallets and 630 mm pallets, can also be used. As is commonly known, the pallet facilitates movement of the structure 11 within the machining center 10.

The Machine

The machine 18 performs the machining of the parts 24 that are held on the structure 11. Depending upon the intended use, many types of machines can be used, including CNC machines and other robotic equipment. As suggested above, it is preferred that the machine uses a spindle to engage the coupling 50 on the fixture 12, and energizes the pump 40 by rotating the coupling. Generally, it is contemplated that the pump will be energized at the outset of the machining operations, but this may not always be necessary. In some circumstances, the pump may be actuated (or further actuated) between machining operations. Although the pump that is illustrated here is energized by rotating the coupling, other arrangements may be possible. For example, in some circumstances the machine could use a linear motion to activate a piston- or lever-operated pump.

In the illustrated arrangement, the machine 18 is also used to activate the pressure-release valve 66. As with the automation of the pump operation, the automation of the pressure-release system may help to prevent operator errors. As noted above, in the illustrated arrangement the machine activates the pressure-release valve (after the machining operations have been completed) by using the spindle 54 to press the button 68 on the pressure-release valve. Other mechanical methods of activation, including linear movement of a lever or rotation of a knob, are also possible.

Use of the machine 18 to mechanically activate the pressure-release valve 66 will sometimes be preferred because it does not require an electrical connection to the fixture 12. In some situations, however, it may be preferred to activate the pressure-release valve electrically.

This description of various embodiments of the invention has been provided for illustrative purposes. Revisions or modifications of the system may be apparent to those of ordinary skill in the art without departing from the invention. The full scope of the invention is set forth in the following claims.

The invention claimed is:

1. A fixture for machining parts that has:
   mechanically-powered hydraulic pump;
   a pressure relief valve;
   one or more hydraulic swing cylinders for holding a part to be machined;
   at least one hydraulic circuit that is connected to the pump, the hydraulic circuit including a pressurized section and a release section, the pressurized section extending from an outlet side of the pump to the one or more swing cylinders, and the release section extending from the one or more swing cylinders to an inlet side of the pump via the pressure release valve; and
   a rotatable coupling that is mechanically connected to the pump and receives a spindle from a CNC machine, enabling the machine to power the pump by rotating the spindle while the spindle is received in the rotatable coupling.

2. A fixture as recited in claim 1, in which the pressure-release valve is positioned where it can be actuated by the spindle.

3. A fixture as recited in claim 1, in which the coupling has at least two axially extending prongs that separate a transverse slot that accommodates the spindle.

4. A fixture as recited in claim 1, in which:
   the coupling has at least two axially extending prongs that separate a transverse slot that accommodates the spindle; and
   the prongs have ends that taper inwardly toward the slot.

5. A fixture as recited in claim 1, in which the fixture also has a pressure gauge on the hydraulic line.

6. A fixture as recited in claim 1, in which:
   the fixture has multiple work faces that each hold parts to be machined; and
   the hydraulic circuit supplies each work face.

7. A fixture as recited in claim 1, in which:
   the fixture has multiple work faces that each hold a fixture plate on which parts to be machined are intended to be mounted; and
   the hydraulic circuit supplies a hydraulic coupler on each of the work faces.

8. A fixture as recited in claim 1, in which:
the fixture has at least four upright work faces that are each angled with respect to each other, the sum of the interior angles between consecutive faces being no less than 300°.

9. A fixture as recited in claim 1, in which the fixture also has:
a hydraulic reservoir on the hydraulic circuit, between the pump and the pressure-release valve.

10. A fixture as recited in claim 1, in which the fixture also has:
a check valve on the hydraulic line, between the pump and the pressure-release valve.

11. A fixture as recited in claim 1, in which:
the fixture also has multiple work faces that have parallel axes and are angled with respect to each other;
the fixture also has an access face that separates two of the work faces;
the coupling is on the access face; and
wherein the pressure-release can be activated from the access face.

12. A fixture as recited in claim 1, in which the fixture also has:
an integrated hydraulic reservoir.

13. A fixture for machining parts that has:
an integrated hydraulic pump;
a pressure relief valve;
one or more hydraulic swing cylinders for holding a part to be machined;
at least one hydraulic circuit that is connected to the pump, the hydraulic circuit including a pressurized section and a release section, the pressurized section extending from an outlet side of the pump to the one or more hydraulic swing cylinders, and the release section extending from the one or more hydraulic swing cylinders to an inlet side of the pump via the pressure release valve; and
at least four work faces that have parallel axes and are angled with respect to each other;
an access face that has an axis that is parallel to the parallel axes of the work faces and separates two of the work faces; and
a robotically-operable coupling on the access face that is connected to the pump.

14. A machining fixture as recited in claim 13, in which the pressure-release valve is located on the access face.

15. A machining center that has:
a moveable structure that holds parts that are to be machined;
hydraulically actuated equipment that is integrated into the structure;
a hydraulic pump that is integrated into the structure;
a pressure relief valve;
a reservoir; and
at least one hydraulic circuit that is connected to the pump, the hydraulic circuit including a pressurized section and a release section, the pressurized section extending from an outlet side of the pump to the hydraulically actuate equipment, and the release section extending from the one or more swing cylinders to an inlet side of the pump via the pressure release valve and the reservoir.

16. A machining center as recited in claim 15, in which the hydraulically actuated equipment is mounted on a fixture plate that is quick-release mounted to a fixture.

17. A machining center that has:
a pallet that moves within the machining center;
a structure that is attached to the pallet and holds parts that are to be machined;
a remotely actuatable hydraulic pump that is integrated into the structure;
a hydraulic reservoir that is integrated into the structure;
one or more swing cylinders for holding the parts to be machined;
at least one hydraulic circuit that is connected to the pump, the hydraulic circuit including a pressurized section and a release section, the pressurized section extending from an outlet side of the pump to the one or more swing cylinders, and the release section extending from the one or more swing cylinders to an inlet side of the pump via the pressure release valve and the hydraulic reservoir; and
a machine that machines parts that are held on the structure.

18. A machining center as recited in claim 17, in which the machine mechanically powers the pump.

* * * * *